US007296184B2

(12) United States Patent
Derks et al.

(10) Patent No.: US 7,296,184 B2
(45) Date of Patent: Nov. 13, 2007

(54) METHOD AND SYSTEM FOR MASKING DYNAMIC REGIONS IN A USER INTERFACE TO ENABLE TESTING OF USER INTERFACE CONSISTENCY

(75) Inventors: Patrick Joseph Derks, Redmond, WA (US); Andrew Seres, Redmond, WA (US); Jidesh Veeramachaneni, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 642 days.

(21) Appl. No.: 10/767,231

(22) Filed: Jan. 28, 2004

(65) Prior Publication Data
US 2005/0177772 A1   Aug. 11, 2005

(51) Int. Cl.
 *G06F 11/00* (2006.01)
(52) U.S. Cl. .................................................. 714/25
(58) Field of Classification Search .............. 714/25, 714/38, 37; 382/153, 192; 715/726, 21–5
See application file for complete search history.

(56) References Cited

U.S. PATENT DOCUMENTS

| 5,777,759 | A | * | 7/1998 | Kaburagi et al. | ........... 358/536 |
| 5,795,688 | A | * | 8/1998 | Burdorf et al. | ............... 430/30 |
| 5,974,254 | A | * | 10/1999 | Hsu | ........................... 717/109 |
| 6,122,401 | A | * | 9/2000 | Nagao | ........................ 382/216 |
| 6,278,458 | B1 | * | 8/2001 | Avila | ......................... 345/420 |
| 6,300,955 | B1 | * | 10/2001 | Zamir | ........................ 382/283 |
| 6,738,081 | B2 | * | 5/2004 | Gupta et al. | ................. 715/767 |
| 7,050,615 | B2 | * | 5/2006 | Avinash et al. | ............. 382/131 |
| 7,100,150 | B2 | * | 8/2006 | Polk | ........................... 717/124 |
| 2004/0130554 | A1 | * | 7/2004 | Bangham | .................... 345/589 |
| 2006/0277520 | A1 | * | 12/2006 | Gennari | ....................... 716/21 |

OTHER PUBLICATIONS

J. Takahashi, "An Automated Oracle For Verifying GUI Objects", IEE, Software Engineering Notes, vol. 26, No. 4, pp. 83-88, Jul. 2001.
L. Smith et al., "Android: Open-Source Scripting for Testing and Automation", IEE, Dr. Dobb's Journal, vol. 26, Issue 7, pp. 99-102, Jul. 2001.
J. Takahashi et al., "Effective Automated Testing: A Solution of Graphical Object Verification", IEEE, Proceedings of the 11th Asian Test Symposium, pp. 284-291, Nov. 18-20, 2002.
T. Pugh, "Automated Testing & Windows CE", IEE, Dr. Dobb's Journal, vol. 27, Issue 12, pp. 54-62, Dec. 2002.
J. Takahashi et al., "Effective Automated Testing for Graphical Objects", IEE, Transactions of the Information Processing Society of Japan, vol. 44, No. 7, pp. 1696-1708, Jul. 2003.

* cited by examiner

*Primary Examiner*—Robert W. Beausoliel, Jr.
*Assistant Examiner*—Amine Riad
(74) *Attorney, Agent, or Firm*—Merchant & Gould P.C.

(57) ABSTRACT

A system and method for masking dynamic regions of a user interface that assist in testing of the static user interface layout. The masking regions are used to eliminate the regions of the user interface layout that are expected to change during a verification process. The present invention allows a user to add masks to the dynamic areas of a screen for selectively ignoring those areas during testing.

20 Claims, 6 Drawing Sheets

METHOD AND SYSTEM FOR MASKING DYNAMIC REGIONS IN A USER INTERFACE TO ENABLE TESTING OF USER INTERFACE CONSISTENCY

CROSS-REFERENCE TO RELATED APPLICATION

The present invention is related to a patent application entitled "Method and System for Automatically Determining Differences in a User Interface Throughout a Development Cycle," filed concurrently with this application. The related application is assigned to the assignee of the present patent application and hereby incorporated by reference.

BACKGROUND OF THE INVENTION

Complexity of mobile devices such as cellular phones, personal data assistants (PDAs), handheld computers, and others, continues to increase. The market for such devices is steadily becoming a worldwide market, requiring the devices to provide content in a number of different languages. Each different platform may further include a variety of options that result in different user interface outputs depending on the options selected.

The user interface of the device provides the mechanism through which the content of an application on the device is displayed to a user. A user interface provides a set of commands or menus through which a user communicates with a program. A command-driven interface is one in which you enter commands. A menu-driven interface is one in which you select command choices from various menus displayed on the screen.

The user interface is one of the most important parts of any program because it determines how easily you can make the program do what you want. A powerful program with a poorly designed user interface has little value. Graphical user interfaces (GUIs) that use windows, icons, and pop-up menus have become standard on personal computers. Accordingly, for the variety of languages that exist, the user interface is adapted to provide the content and commands in the language required. In addition, a matrix of other differences may exist between user interfaces. For example, a user interface may be displayed in portrait or landscape, in different resolutions, with or without a software input panel (SIP), and with a host of other variables. When verifying a user interface through testing, certain aspects displayed on a user interface may change over time that may affect the verification results. For example, a user interface may display a clock. When verifying the user interface for consistency, the clock corrupts the results, because the time displayed will not be consistent. When verifying the user interface, notification of expected changes does not further the analysis of the user interface's consistency. What is needed is a way to remove the clock and other changeable aspects from the analysis of the user interface, such that the verification results are more efficient.

SUMMARY OF THE INVENTION

The present invention provides a system and method for masking dynamic regions of a user interface that assist in testing of the static user interface layout. The masking regions are used to eliminate the regions of the user interface layout that are expected to change during a verification process. The present invention allows a user to add masks to the dynamic areas of a screen for selectively ignoring those areas during testing. Stated differently, the present invention provides a method for reducing the false positives during test that may be caused by dynamic areas of the user interface screen. These false positives can create "noise" in the testing results that may overwhelm the actual results being examined by the testing. The ability to mask out dynamic regions on the screen such as the clock and animations helps reduce the amount of noise created by these dynamic regions. Additionally, the masking functionality allows the testing process to iterate through portions of the user interface (e.g., the menu bar display) without impacting the ability to maintain a baseline snapshot for comparison.

DETAILED DESCRIPTION

The present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
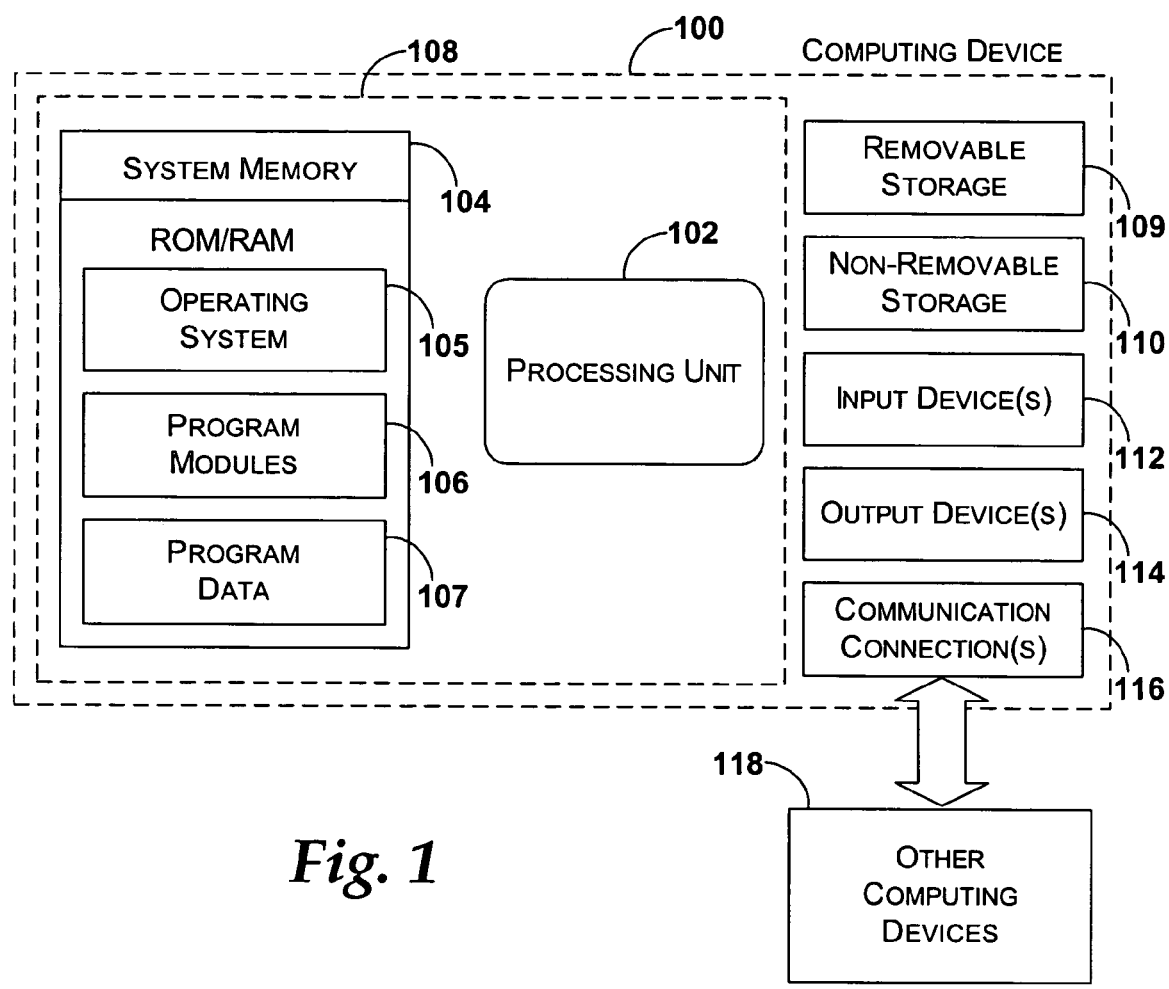
FIG. 1 illustrates an exemplary computing device that may be used in one exemplary embodiment of the present invention.

FIG. 1 shows an exemplary computing device that may be included in system 100 for implementing the invention. Computing device 100 illustrates a general operating environment that may apply to the present invention. In a very basic configuration, computing device 100 typically includes at least one processing unit 102 and system memory 104. Processing unit 102 includes existing physical processors, those in design, multiple processors acting together, virtual processors, and any other device or software program capable of interpreting binary executable instructions. Depending on the exact configuration and type of computing device, the system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of computing device 100. Computing device 100 may also have input device(s) 112 such as keyboard, mouse, pen, stylus, voice input device, touch input device, etc. Output device(s) 114 such as a display, speakers, printer, etc. may also be included. All these devices are known in the art and need not be discussed at length here.

Computing device 100 may also contain communications connection(s) 116 that allow the device to communicate with other computing devices 118, such as over a network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
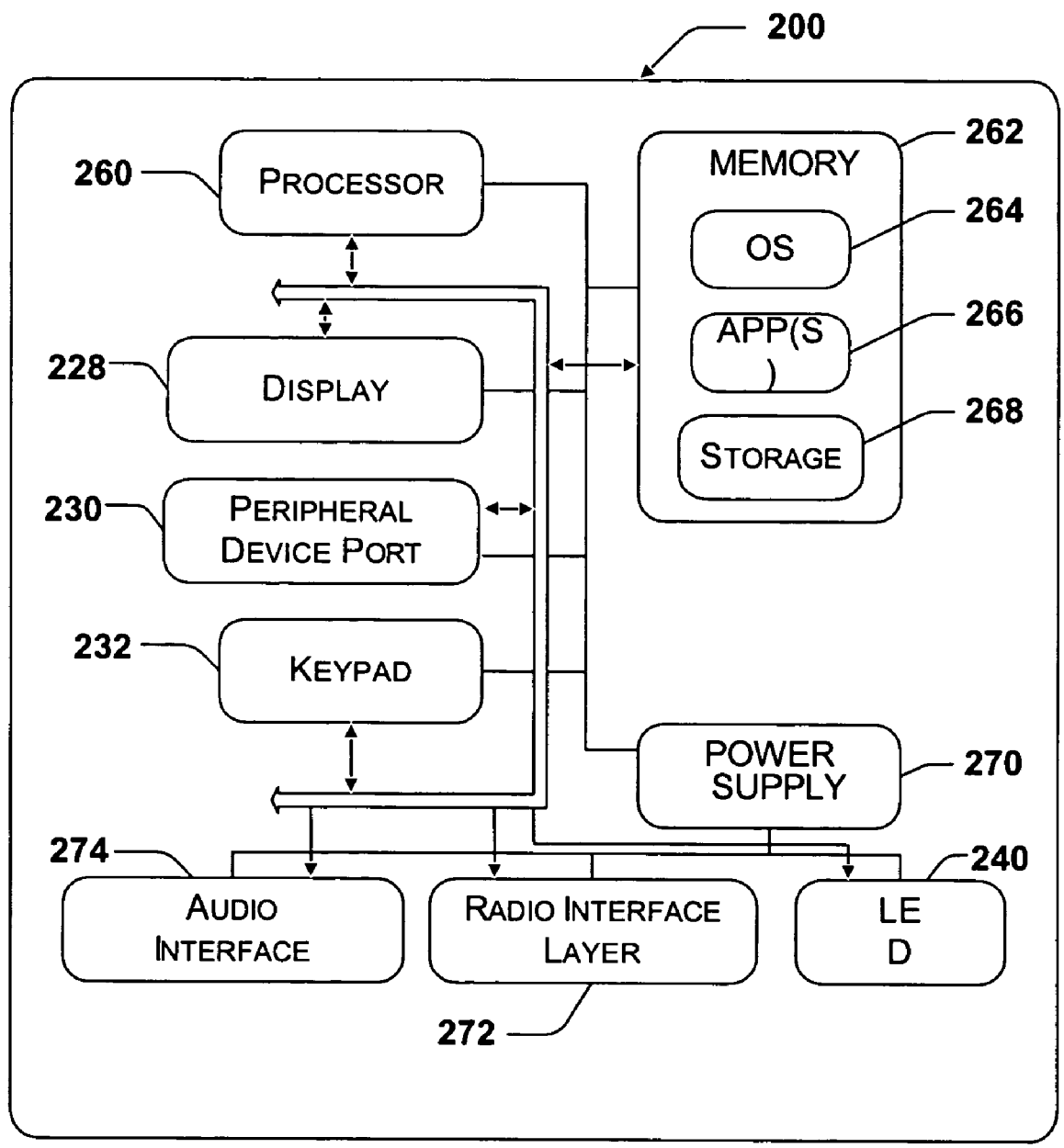
FIG. 2 illustrates an exemplary mobile device that may be used in one exemplary embodiment of the present invention.

FIG. 2 shows an alternative operating environment for a mobile device substantially for use in the present invention. In one embodiment of the present invention, mobile device 200 is integrated with a computing device, such as an integrated personal digital assistant (PDA) and wireless phone.

In this embodiment, mobile device 200 has a processor 260, a memory 262, a display 228, and a keypad 232. Memory 262 generally includes both volatile memory (e.g., RAM) and non-volatile memory (e.g., ROM, Flash Memory, or the like). Mobile device 200 includes an operating system 264, which is resident in memory 262 and executes on processor 260. Keypad 232 may be a push button numeric dialing pad (such as on a typical telephone), a multi-key keyboard (such as a conventional keyboard), or may be not be included in the mobile device in deference to a touch screen or stylus. Display 228 may be a liquid crystal display, or any other type of display commonly used in mobile computing devices. Display 228 may be touch-sensitive, and would then also act as an input device.

One or more application programs 266 are loaded into memory 262 and run on operating system 264. Examples of application programs include phone dialer programs, e-mail programs, scheduling programs, PIM (personal information management) programs, word processing programs, spreadsheet programs, Internet browser programs, and so forth. Mobile device 200 also includes non-volatile storage 268 within the memory 262. Non-volatile storage 268 may be used to store persistent information which should not be lost if mobile device 200 is powered down. The applications 266 may use and store information in storage 268, such as e-mail or other messages used by an e-mail application, contact information used by a PIM, appointment information used by a scheduling program, documents used by a word processing application, and the like. A synchronization application also resides on the mobile device and is programmed to interact with a corresponding synchronization application resident on a host computer to keep the information stored in the storage 268 synchronized with corresponding information stored at the host computer.

Mobile device 200 has a power supply 270, which may be implemented as one or more batteries. Power supply 270 might further include an external power source, such as an AC adapter or a powered docking cradle that supplements or recharges the batteries.

Mobile device 200 is also shown with two types of external notification mechanisms: an LED 240 and an audio interface 274. These devices may be directly coupled to power supply 270 so that when activated, they remain on for a duration dictated by the notification mechanism even though processor 260 and other components might shut down to conserve battery power. LED 240 may be programmed to remain on indefinitely until the user takes action to indicate the powered-on status of the device. Audio interface 274 is used to provide audible signals to and receive audible signals from the user. For example, audio interface 274 may be coupled to a speaker for providing audible output and to a microphone for receiving audible input, such as to facilitate a telephone conversation.

Mobile device 200 also includes a radio 272 that performs the function of transmitting and receiving radio frequency communications. Radio 272 facilitates wireless connectivity between the mobile device 200 and the outside world, via a communications carrier or service provider. Transmissions to and from the radio 272 are conducted under control of the operating system 264. In other words, communications received by the radio 272 may be disseminated to application programs 266 via the operating system 264, and vice versa.

The radio 272 allows the mobile device 200 to communicate with other computing devices, such as over a network. The radio 272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Masking Dynamic Regions of a User Interface

Figure 3:
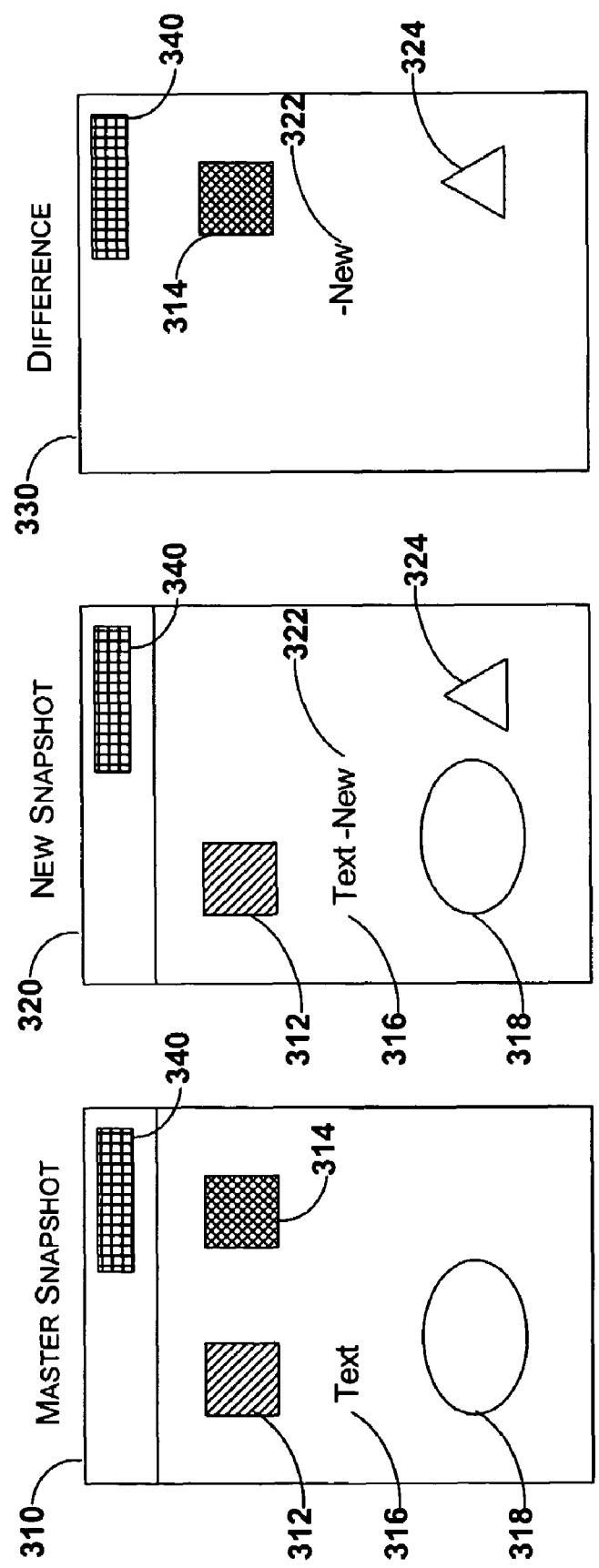
FIG. 3 illustrates exemplary snapshots in accordance with the present invention.

FIG. 3 illustrates exemplary snapshots in accordance with the present invention. The snapshots included are mater snapshot 310, also referred to as a baseline snapshot, new snapshot 320, which refers to the snapshot most recently taken, and difference snapshot 330, which provides a visual representation of the difference between the master snapshot and the new snapshot.

Each of the exemplary snapshots shown includes graphical elements and textual elements. In other embodiments, the snapshots may include other elements, such as animations, that may also be capture when the snapshots of the user interface are taken. In the example shown, master snapshot 310 includes graphical elements 312, 314, and 318 and textual element 316. New snapshot 320 includes graphical elements 312, 318, and 324 and textual elements 316 and 322. Upon visual inspection of master snapshot 310 and new snapshot 320, differences are noticeable. The differences between master snapshot 310 and new snapshot 320 are visually represented by difference snapshot 330 on a pixel-by-pixel basis. For each pixel that is different between master snapshot 310 and new snapshot 320, a black pixel is depicted in difference snapshot 330. In one embodiment, a confirmation message such as text reading "no difference" is provided if there is no difference between master snapshot 310 and new snapshot 320.

For example, graphical element 314 is included in master snapshot 310 and not included in new snapshot 320. Due to the difference, the pixels corresponding to graphical element 314 are represented as black pixels in difference snapshot 330. Similarly, textual element 322 and graphical element 324 are included in new snapshot 320 but do not appear in master snapshot 310. As a result, the pixels that correspond to textual element 322 and graphical element 324 are depicted as black pixels in difference snapshot 330 to illustrate that master snapshot 310 and new snapshot 320 differ with respect to these elements. The result in difference snapshot 330 is a readily understandable visual depiction of the differences between master snapshot 310 and new snapshot 320. It is understood that the color of the pixels in difference snapshot 330 is selectable, and black pixels are referred to merely as an example.

Also illustrated in each snapshot shown in FIG. 3, is mask 340. A mask may be optionally included within each snapshot to exclude portions of the user interface from comparison. For example, a clock element included in the user interface changes over time. As a result the clock element would be shown as a difference between master snapshot 310 and each subsequent snapshot taken during a development cycle. Masking the portion of the user interface that corresponds to the clock animation avoids the false positives that result from the difference in each snapshot. A mask is selectable corresponding to coordinates on the snapshot of the user interface. A mask may be chosen to be a default mask, such that all snapshots throughout a development cycle have that portion of the user interface masked automatically when the snapshots are taken. The mask may also be chosen as an individual snapshot mask to mask a portion of a snapshot for a single group of snapshots that are compared.

In one embodiment, when the snapshots of the user interface are recorded, a bitmap file of the snapshot image is recorded along with an extensible markup language (XML) file. The XML file includes information such as the language, screen size, SKU (i.e. edition), and other aspects of the target device from which the snapshot is taken. The bitmap file and the XML file are stored in a database described in more detail with respect to FIG. 5 below.

The following is an exemplary portion of an XML file that may be generated in accordance with the present invention:

```
<?xml version="1.0" ?>
- <!-- VisualDiff - File Import Information -->
- <VisualDiff-FileImportInfo>
    <Source>Shell_Notifications_TestApp</Source>
    <Area>ShellAPI</Area>
    <SIP>0</SIP>
    <Title>Shell_Notifications_Bad_SHNOTIFICATION_Struct
    </Title>
    <Product>Magneto-PocketPC Phone</Product>
    <LCID>0409 </LCID>
    <ColorDepth>16</ColorDepth>
    <ScreenX>240</ScreenX>
    <ScreenY>320</ScreenY>
    <BuildNum>14020</BuildNum>
    <Platform >x86</Platform>
    <Filename>
    VD_ShellAPI_Shell_Notifications_Bad_SHNOTIFICATION_
    Struct_Magneto-PocketPCPhone040916240320_
    14020_x8601272004211634.bmp</Filename>
  </VisualDiff-FileImportInfo>
```

As shown in this example, the XML file includes a number of variables related to the display of the UI target device. With this information from the XML file, a particular snapshot may be uniquely identified within the database.

Figure 4:
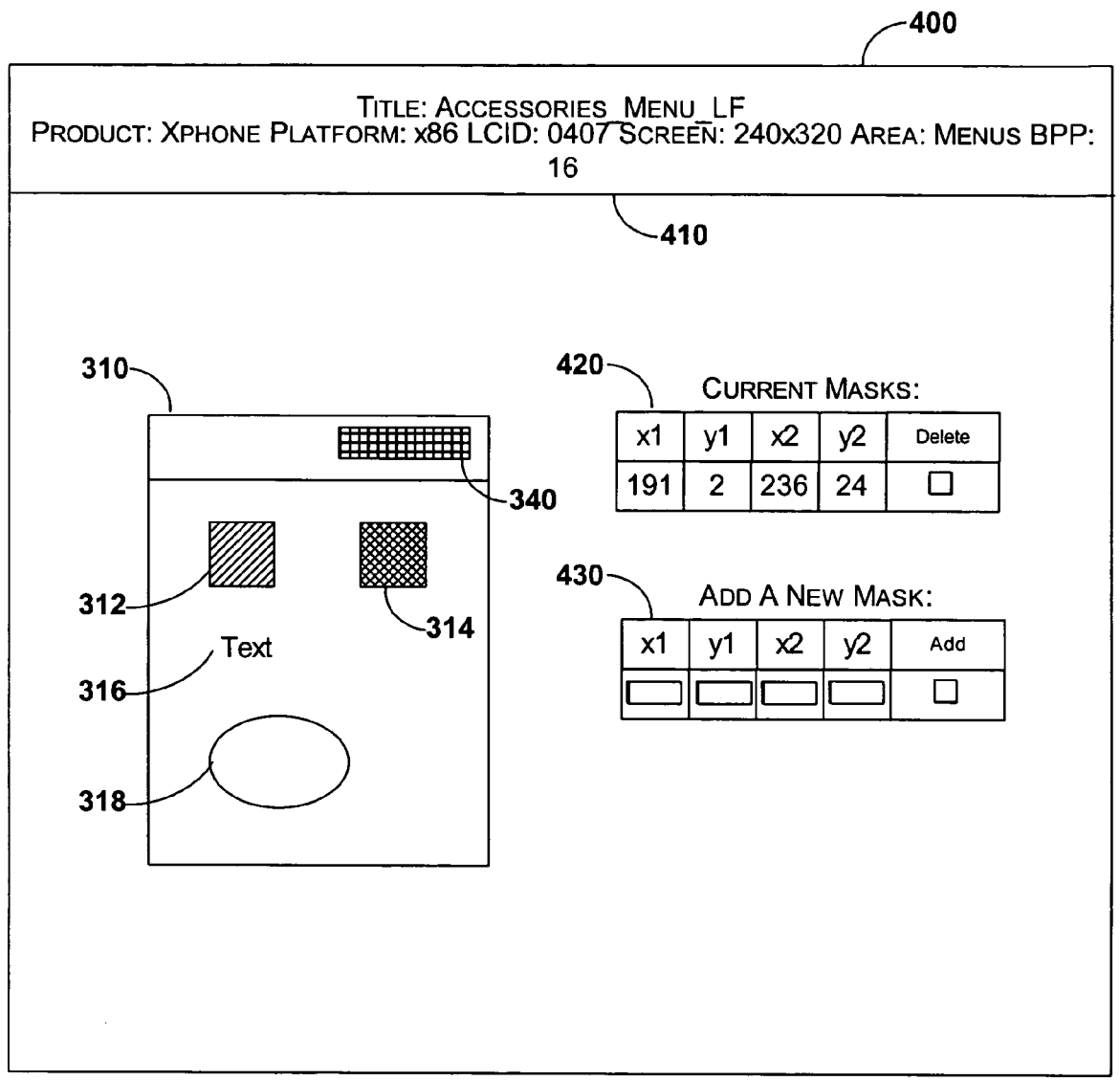
FIG. 4 illustrates an exemplary mechanism for applying a mask to a user interface for testing in accordance with the present invention.

FIG. 4 illustrates an exemplary mechanism for applying a mask to a user interface for testing in accordance with the present invention. The mechanism 400 includes an interface that presents a particular snapshot and options for adding or deleting masks to the snapshot.

In the example shown, snapshot 310 is identified according to a list of header information 410. Header information 410 provides properties related to snapshot 310 that are provided by the XML file generated at the time the snapshot was taken. Header information 410 includes the title of snapshot 310, the product or type of user interface device from which snapshot 310 was taken, the platform used, a version ID, a screen size, an area identifier, and a bits per pixel (BPP) designation.

In the example shown, snapshot 310 includes an existing mask 340. The pixel coordinates of mask 340 is shown in current masks table 420. The pixel coordinates include two X-axis coordinates and two Y-axis coordinates that define the rectangle mask 340. An option is included in current masks table 420 for deleting the mask from snapshot 310.

In addition, add a new mask table 430 is also included in mechanism 400. Add a new mask table 430 allows a user to insert a new mask into snapshot 310 by providing the sets of X and Y coordinates. It is appreciated that any number of masks may be added to snapshot 310.

Figure 5:
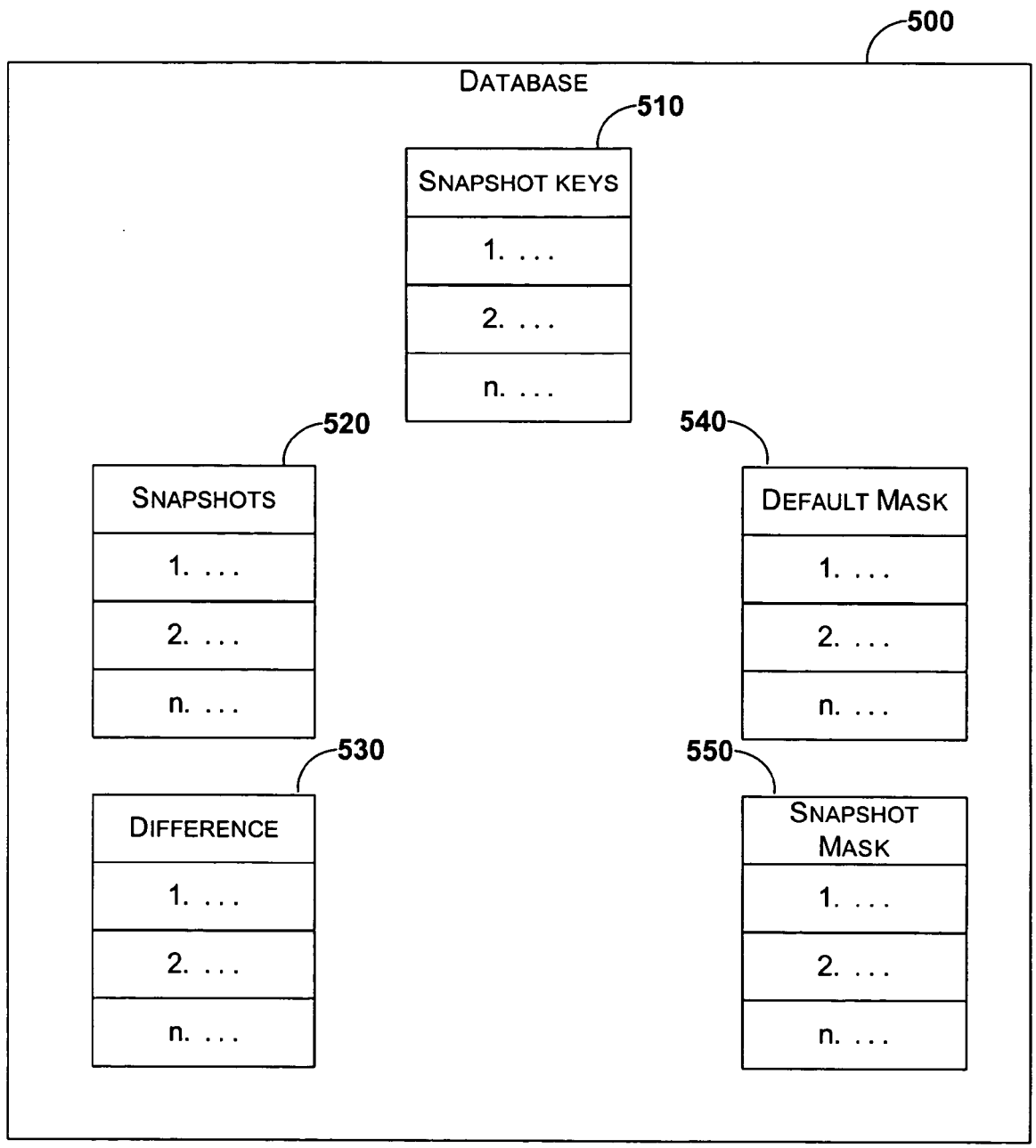
FIG. 5 illustrates an exemplary functional block diagram of a database used for comparing snapshots in accordance with the present invention.

FIG. 5 illustrates an exemplary functional block diagram of a database used for comparing snapshots in accordance with the present invention. Database 500 includes snapshot keys table 510, snapshots table 520, difference table 530, default mask table 540, and snapshot mask table 550.

Snapshot key table 510 includes a list of snapshot keys that identify each group of snapshots stored on database 500 as the snapshots are generated. In one embodiment, each snapshot key is defined according to information extracted from the XML file generated when the snapshot was taken. Accordingly, the key is generated using information regarding the device edition, the platform used, the language used, the color depth of the device, the screen size, and other unique aspects related to the snapshot. In one embodiment, the language identifier of the snapshot key may be selectively ignored when generating a mask. A mask is applied to those snapshots that correspond with a particular snapshot key. Removing the language identifier from the snapshot key for a particular mask, applies that mask to all language versions of that snapshot.

Snapshots table 520 includes a list of the snapshots taken by filename and a count incremented to indicate that this is the latest confirmed snapshot of a development cycle. The filename of the individual snapshots in snapshot table 520 is associated with at least one of the snapshot keys listed in snapshot key table 510. As new snapshots are generated, the new snapshots are added into snapshots table 520. Alternatively, when a snapshot corresponds to and matches a snapshot within snapshots table 520, the previous snapshot is replaced with the latest confirmed snapshot, and the count is incremented.

Difference table 530 includes the difference shapshots. The new snapshots having a particular snapshot key are compared with previous snapshots having the same key. If no difference exists between a new snapshot and a previous snapshot having the same key, the previous snapshot is replaced with the latest confirmed snapshot. If a difference does exist, the difference snapshot is included within difference table 530.

Default mask table 540 includes a list of default masks. The default masks are each identified by product and screen size. As snapshots are generated and listed in snapshot table 520, default mask table 540 is examined to determine if there are any applicable default masks. Any number of default masks within default mask table 540 may be applicable to a particular snapshot according to its product and screen size. For a new snapshot, if the snapshot key of that snapshot maps to the same product and screen size as a default mask, that default mask is associated with the snapshot. In one embodiment, a variable may be set in the XML file of a snapshot to prevent default masks from being applied. If a default mask is determined to correspond to a snapshot listed in snapshots table 520, the default mask is loaded into snapshot mask table 550.

Snapshot mask table 550 includes the snapshot masks currently being applied to snapshots listed in snapshots table 520. Snapshot mask table 550 may include default masks from default mask table 540. Additionally, masks may generated for particular snapshots according to the mechanism described in FIG. 4 above. Snapshot mask table 550 also includes these user-defined masks, such that snapshot mask table 550 includes the default masks and user-defined masks that are applied to snapshots listed in snapshots table 520.

In one embodiment, database 500 is stored on a server. The content of database 500 is uploaded from a target user interface device to the server. A web application is provided for analysis of the data generated. The interoperability of the database and server with the target user interface device is described in the related application entitled "Method and System for Automatically Determining Differences in a User Interface Throughout a Development Cycle," which is incorporated herein by reference.

In another embodiment, for each snapshot stored in snapshots table 520, a value of the snapshot is calculated. The value of the snapshot is referred to as its cyclical redundancy check (CRC) value, and is generated from the bitmap of the snapshot. The calculated CRC value provide a "fast check" mechanism whereby snapshots may be compared quickly by their CRC values. When a new mask is added to a particular snapshot, the CRC value is recalculated. Recalculating the CRC values allows snapshots with user-defined masks to be "fast check" compared and confirmed that would otherwise have been shown as having differences.

In a further embodiment, a default mask may be directly applied to the snapshots corresponding to the snapshot key of the default mask. This option may be provided instead of loading the default masks of default mask table 540 into snapshot mask table 550 when a corresponding snapshot is present in snapshots table 520. However, by loading the default masks of default mask table 540 into snapshot mask table 550, a user has an option to later delete a default mask for a particular snapshot.

In still a further embodiment, the present invention provides a mechanism whereby a number of difference snapshots that resulted from a set of comparisons may have a mask added. For example, a set of difference snapshots may be generated due to an animation element on the screen that was not previously addressed. A "bulk" add mask operation may then be selected that adds a mask to the difference snapshots corresponding to the coordinates of the animation. The "bulk" add mask operation allows a tester to remove the pixel differences caused by the animation and concentrate on differences caused by errors and other elements.

Figure 6:
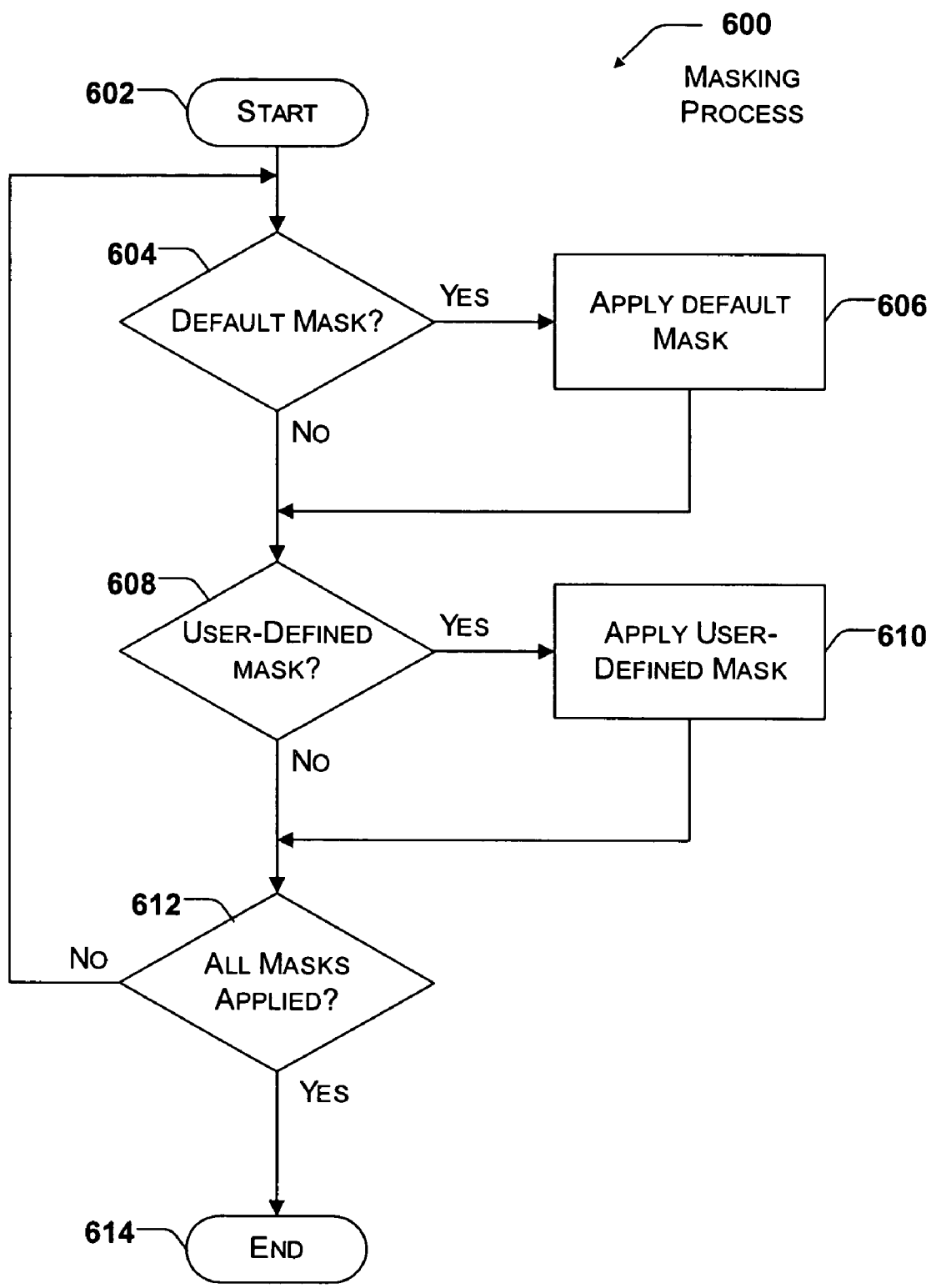
FIG. 6 illustrates a logical flow diagram for applying a mask to a user interface for testing in accordance with the present invention.

FIG. 6 illustrates a logical flow diagram for applying a mask to a user interface for testing in accordance with the present invention. Process 600 begins at block 602 where an application for comparing snapshots is implemented that includes the functionality for providing masks for the snapshots. Processing continues at decision block 604.

At decision block 604, a determination is made whether a default mask is selected to be applied to a snapshot. If no default mask is to be applied to a snapshot, processing advances to decision block 608. Conversely, if the default mask is selected to be applied to a snapshot processing moves to block 606.

At block 606, the default mask is added to the corresponding snapshot or group of snapshots. In one embodiment, the default mask is automatically selected to be added to each snapshot of a set of snapshots which relate to the default mask. When a new snapshot enters the database whose product and screen size correspond to the default mask, the default mask is applied to the new snapshot. The default mask is copied to the snapshot mask table and each of the new snapshots entering the database is updated to reflect the default mask prior to any comparisons between the masks occurring. In another embodiment, the default mask may be applied to a series of snapshots after a snapshot comparison has occurred. For example, a user may have select to add default mask to a group of related snapshots based upon the result of the comparison between the snapshots. In this example, the default snapshots table is updated to reflect the new default snapshot. Accordingly, the default mask is applied to the snapshots already stored in the database such that these snapshots are compared again. The default snapshot is also set to be applied to future incoming snapshots sharing the same product and screen size. It is appreciated that the choice of whether to apply a default mask to preexisting snapshots may be provided as an option to user without departing from the spirit and scope of the invention. Processing continues at decision block 608.

At decision block 608, a determination is made whether a user-defined mask is selected to be applied to a snapshot. If no user-defined mask is to be applied to a snapshot, processing advances to decision block 612. Conversely, if the user-defined mask is selected to be applied to a snapshot processing moves to block 610.

At block 610, the user-defined mask is added to the corresponding snapshot or group of snapshots. In one embodiment, the user-defined is applied to a series of snapshots after a snapshot comparison has occurred. For example, a user may have select to add user-defined mask to a group of related snapshots based upon the result of the comparison between the snapshots. A mechanism similar to the mechanism shown in FIG. 4 may be used to enter the new user-defined mask. The snapshot mask table is update to include the new user-defined mask and the mask is then applied to the snapshot or selected group of snapshots. According a number of the difference snapshots generated due to pixel differences occurring within the coordinates of the user-defined mask are eliminated. Processing continues at decision block 612.

At decision block 612, a determination is made whether all masks listed in the snapshot mask table have been applied to their related snapshots. If all masks listed have not been applied to their related snapshots, processing returns to decision block 604 where processing continues. Alternatively, if all masks have been applied to their related snapshots, processing advances to block 614 where the process ends.

In accordance with process 600, the present invention provides a method and system for masking dynamic portions of a user interface to eliminate false positives when determining differences in the user interface.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for masking dynamic regions of a user interface for determining differences in the user interface, comprising:
    generating a mask for a first snapshot of the user interface, wherein the mask corresponds to a set of coordinates within the first snapshot and wherein generating the mask for the first snapshot occurs in response to at least one of the following: the mask being included in a default mask table and the mask being included in a snapshot mask table;
    associating the mask with a set of snapshots according to a snapshot key, wherein the set of snapshots includes the first snapshot; and
    applying the mask to the set of snapshots such that the area of each snapshot that corresponds to the coordinates of the mask is ignored when the first snapshot is compared with another snapshot of the set of snapshots.

2. The computer-implemented method of claim 1, wherein the mask is associated with the set of snapshots prior to any comparison between the first snapshot and another snapshot of the set of snapshots.

3. The computer-implemented method of claim 1, further comprising copying mask from the default mask table to a snapshot mask table prior to any comparison between the first snapshot and another snapshot of the set of snapshots.

4. The computer-implemented method of claim 1, wherein the mask is associated with the set of snapshots prior to any comparison between the first snapshot and another snapshot of to set of snapshots.

5. The computer-implemented method of claim 1, wherein the mask is associated with the set of snapshots by a user after the comparison between the first snapshot and another snapshot of to set of snapshots.

6. The computer-implemented method of claim 1, further comprising recalculating a cyclical redundancy check value for the snapshots within the set of snapshots when the mask is associated with the set of snapshots.

7. The computer-implemented method of claim 1, wherein the mask is associated with the set of snapshots according to a bulk add operation.

8. The computer-implemented method of claim 1, wherein the snapshot key is produced from a selectable combination of the information included in a file related to the first snapshot.

9. A computer-readable storage medium that includes computer-executable instructions for masking dynamic regions of a user interface for determining differences in the user interface, comprising:
    generating a mask for a first snapshot of the user interface, wherein the mask corresponds to a set of coordinates within the first snapshot;
    associating the mask with a second snapshot according to a snapshot key, wherein the first snapshot and second snapshot are related according to the snapshot key; and
    applying the mask to first snapshot and the second snapshot such that the area of the first snapshot and the second snapshot that corresponds to the coordinates of the mask is ignored when the first snapshot is compared with the second snapshot; and
    recalculating a cyclical redundancy check value for the snanshots within the set of snapshots when the mask is associated with the set of snapshots.

10. The computer-readable medium of claim 9, wherein generating the mask for a first snapshot occurs in response to the mask being included in a default mask table.

11. The computer-readable medium of claim 9, further comprising copying the mask from a default mask table to a snapshot mask table prior to any comparison between the first snapshot and another snapshot of the set of snapshots.

12. The computer-readable medium of claim 9, wherein generating the mask for a first snapshot occurs in response to the mask being included in a snapshot mask table.

13. The computer-readable medium of claim 9, wherein the mask is associated with the set of snapshots according to a bulk add operation.

14. The computer-readable medium of claim 9, wherein the snapshot key is produced from a selectable combination of the information included in a file related to the first snapshot.

15. A system for masking dynamic regions of a user interface for determining differences in the user interface, comprising:
    a target user interface device from which a first snapshot and second snapshot of the user interface is taken; and
    a server that includes an application that is configured to:
        generate a mask for the first snapshot of the user interface, wherein the mask corresponds to a set of coordinates within the first snapshot,
        associate the mask with the second snapshot according to a snapshot key, wherein the first snapshot and second snapshot are related according to the snapshot key, and
        apply the mask to first snapshot and the second snapshot such that the area of the first snapshot and the second snapshot that corresponds to the coordinates of the mask is ignored when the first snapshot is compared with the second snapshot; and
        generate the mask in response to the being included in a snapshot mask table.

16. The system of claim 15, wherein the application is further configured to generate the mask in response to the mask being included in a default mask table.

17. The system of claim 15, wherein the application is further configured to copy the mask from a default mask table to a snapshot mask table prior to any comparison between the first snapshot and another snapshot of the set of snapshots.

18. The system of claim 15, wherein the application is further configured to recalculate a cyclical redundancy check value for the snapshots within the set of snapshots when the mask is associated with the set of snapshots.

19. The system of claim 15, wherein the mask is associated with the set of snapshots according to a bulk add operation.

20. The system of claim 15, wherein the snapshot key is produced from a selectable combination of the information included in a file related to the first snapshot.

* * * * *